United States Patent
Sundararaman et al.

(10) Patent No.: US 11,829,492 B1
(45) Date of Patent: Nov. 28, 2023

(54) SYSTEM AND METHOD FOR HARDWARE-BASED REGISTER PROTECTION MECHANISM

(71) Applicant: Marvell Asia Pte, Ltd., Singapore (SG)

(72) Inventors: Ramacharan Sundararaman, San Jose, CA (US); Saurabh Shrivastava, Saratoga, CA (US); Avinash Sodani, San Jose, CA (US); Nithyananda Miyar, San Jose, CA (US)

(73) Assignee: Marvell Asia Pte Ltd, Singapore (SG)

( * ) Notice: Subject to any disclaimer, the term of this patent is extended or adjusted under 35 U.S.C. 154(b) by 129 days.

(21) Appl. No.: 17/162,521

(22) Filed: Jan. 29, 2021

Related U.S. Application Data

(60) Provisional application No. 63/037,473, filed on Jun. 10, 2020, provisional application No. 63/037,484, filed on Jun. 10, 2020.

(51) Int. Cl.
*H04L 29/06* (2006.01)
*G06F 21/62* (2013.01)

(52) U.S. Cl.
CPC .................................. *G06F 21/62* (2013.01)

(58) Field of Classification Search
CPC ................................. G06F 21/62; G06F 21/70
See application file for complete search history.

(56) References Cited

U.S. PATENT DOCUMENTS

| | | | |
|---|---|---|---|
| 2007/0267504 A1 | 11/2007 | Beeson | |
| 2014/0317372 A1* | 10/2014 | Herrick | G06F 12/1458 711/163 |
| 2015/0301761 A1* | 10/2015 | Sijstermans | G06F 3/0644 711/163 |
| 2018/0267905 A1* | 9/2018 | Kawai | G06F 12/1009 |
| 2020/0301590 A1 | 9/2020 | Bell et al. | |

* cited by examiner

*Primary Examiner* — Jason K Gee

(57) ABSTRACT

A new approach is proposed to support hardware-based protection for registers of an electronic device. Sources requesting access to the registers are categorized into a set of internal sources that can be trusted and a set of external sources that are untrusted. The registers are classified into a set of internal registers allowed to be accessed by the internal resources only, a set of read-only external registers that can be read by the external resources in addition to accessed by the internal resources, and a set of read/write external registers that can be read and written by both the internal and the external resources. Each access request by a source to the registers includes the source type, wherein access request is granted or denied based on the matching between the source bits in the access request and the register classification bits of the one or more registers to be accessed.

30 Claims, 2 Drawing Sheets

200 →

```
┌─────────────────────────────────────────────────────┐
│ Maintain certain data associated with an electronic │
│ device via one or more registers, wherein each of   │
│ the one or more registers is classified into one of │
│ a plurality of register types                       │
│                         202                         │
└─────────────────────────────────────────────────────┘
                           │
                           ▼
┌─────────────────────────────────────────────────────┐
│ Generate and transmit an access request by a source │
│ for read or write access to the certain data        │
│ maintained in the one or more registers, wherein    │
│ the source is categorized into one of a plurality   │
│ of source types, wherein the source type of the     │
│ source is transmitted with the access request       │
│                         204                         │
└─────────────────────────────────────────────────────┘
                           │
                           ▼
┌─────────────────────────────────────────────────────┐
│ Accept the access request with the source type from │
│ the source and identify the one or more registers   │
│ to be accessed for a read or write operation        │
│                         206                         │
└─────────────────────────────────────────────────────┘
                           │
                           ▼
┌─────────────────────────────────────────────────────┐
│ Identify the register types of the one or more      │
│ registers to be accessed                            │
│                         208                         │
└─────────────────────────────────────────────────────┘
                           │
                           ▼
┌─────────────────────────────────────────────────────┐
│ Compare the source type of the source requesting    │
│ access to the one or more registers with the        │
│ register types of the one or more registers         │
│                         210                         │
└─────────────────────────────────────────────────────┘
                           │
                           ▼
┌─────────────────────────────────────────────────────┐
│ Determine whether to grant or deny read or write    │
│ access to the one or more registers by the source   │
│ based on the comparison between the source type of  │
│ the source requesting access and the register types │
│ of the one or more registers to be accessed         │
│                         212                         │
└─────────────────────────────────────────────────────┘
```

FIG. 2

SYSTEM AND METHOD FOR HARDWARE-BASED REGISTER PROTECTION MECHANISM

CROSS-REFERENCE TO RELATED APPLICATIONS

This application claims the benefit of U.S. Provisional Patent Application Nos. 63/037,473 and 63/037,484, both were filed Jun. 10, 2020 and incorporated herein in their entireties by reference.

This application is related to co-pending U.S. Pat. No. 17,162,046, filed Jan. 29, 2021, which is incorporated herein in its entirety by reference.

BACKGROUND

Device security is becoming more and more important given the prevalence use and the personal nature of electronic devices. Any gap in security of an electronic device may expose the electronic device to a malicious attack. In some cases, the data and/or software (e.g., firmware) of the electronic device may be stored in internal control and state registers of the electronic device and may be accessed and updated by multiple agents of an external platform/device/system, e.g., ARM CPU cores, Power Management Controller (PMC) etc. In some cases, the internal control and state registers of the electronic device may be exposed to the external platform/device/system over one or more interfaces and thus providing an attack surface for an attacker to directly attack the electronic device or indirectly through an escalation of access privilege to the electronic device. For non-limiting examples, each of the interfaces through which the attack can be launched includes but is not limited to a Peripheral Component Interconnect Express (PCIe) interface for connecting high-speed components of the platform, and an Inter-Integrated Circuit (I2C) interface, which is a serial two-wire interface to connect low-speed devices such as microcontrollers, EEPROMs, A/D and D/A converters, I/O interfaces and other similar peripherals in the electronic device. If attacked, any micro-architecture-specific registers such as the state registers of the electronic device may cause a security issue, e.g., a Denial of Service (DOS) attack and/or leak of information of the electronic device, thus putting the electronic device in an unsafe operation or resulting in loss of intellectual properties (IPs).

Currently, register protection for the electronic device may be done by blocking read and/or write access by external devices to the internal state registers of the electronic device entirely so that the register states are not exposed externally. This may not always be feasible and may cause difficulty when it is necessary for an external device to access the registers (e.g., to update the firmware of the electronic device). In some embodiments, "shadow" registers may be created for the state registers that are vulnerable to attacks, wherein the shadow registers allows access based on the source of access. This approach, however, requires duplication of the state registers, which takes additional resources of the electronic device and may cause inconsistency issues with respect to the software or data maintained in the registers.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 2 depicts a flowchart of an example of a process to support hardware-based register protection according to one aspect of the present embodiments.

DETAILED DESCRIPTION

Figure 1:
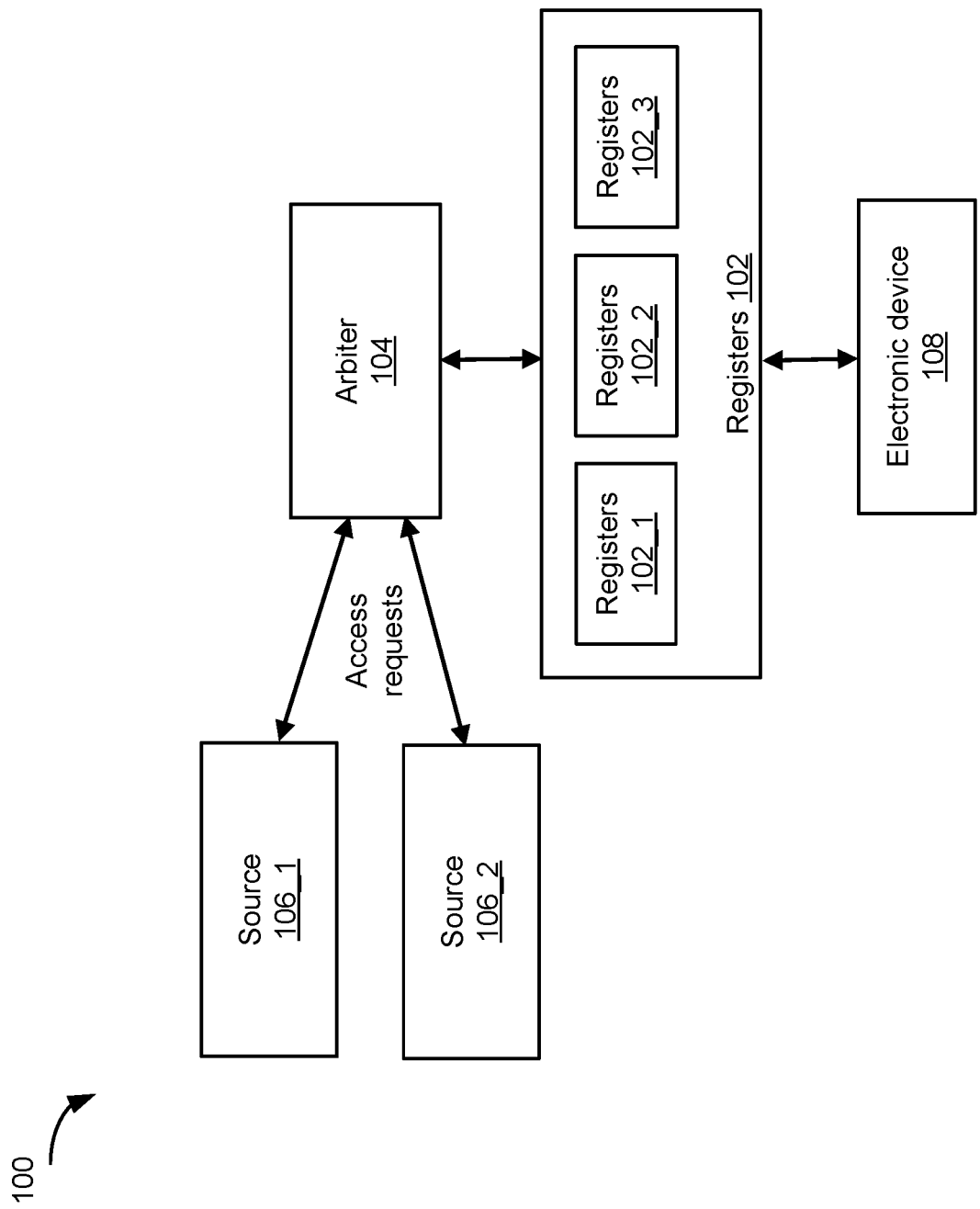
FIG. 1 depicts an example of a diagram of a hardware-based register protection mechanism according to one aspect of the present embodiments.

The following disclosure provides many different embodiments, or examples, for implementing different features of the subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Before various embodiments are described in greater detail, it should be understood that the embodiments are not limiting, as elements in such embodiments may vary. It should likewise be understood that a particular embodiment described and/or illustrated herein has elements which may be readily separated from the particular embodiment and optionally combined with any of several other embodiments or substituted for elements in any of several other embodiments described herein. It should also be understood that the terminology used herein is for the purpose of describing the certain concepts, and the terminology is not intended to be limiting. Unless defined otherwise, all technical and scientific terms used herein have the same meaning as commonly understood in the art to which the embodiments pertain.

A new approach is proposed that contemplates systems and methods to support hardware-based protection for one or more registers of an electronic device. Under the approach, one or more sources (e.g., agents/components/processors) requesting access to the one or more registers are categorized into at least two sets—a set of internal sources that can be trusted and a set of external sources that are untrusted. The one or more registers are also classified into multiple sets—a set of internal registers that are allowed to be accessed by the internal resources only, a set of read-only external registers that can also be read by the external resources in addition to being accessed by the internal resources, and a set of read/write external registers that can be read and write accessed by both the internal and the external resources. In some embodiments, the source type and the register type can be represented by one or more source bits and one or more register classification bits, respectively. Each access request by a source to the one or more registers includes the source bits representing the source type. An arbiter is configured to accept the access request, and grant or deny read and/or write access/operation to the one or more registers by the requesting source based on the matching between the source bits in the access request and the register classification bits of the one or more registers to be accessed.

By classifying both the sources and the registers appropriately into different types respectively, the proposed hardware-based register protection mechanism ensures that only certain types of sources can have certain types of access/ operation to the registers maintaining the data and/or software (e.g., firmware) of the electronic device while an untrusted source will be denied read and/or write access to the registers to prevent attacks. Furthermore, the proposed mechanism enables the same set of registers to be protected based on an extensible set of bits without having to duplicate the registers or maintain consistency among multiple set of shadow registers. The proposed mechanism still allows certain read access to the internal state registers of the electronic device when necessary without exposing all of the registers externally. Additionally, since the proposed mechanism is hardware enforced, the security of the data and/or software maintained in the registers cannot be easily compromised.

Note that firmware is mentioned below as a non-limiting example of data and/or software maintained in the registers. It is appreciated that the same or similar approach/mechanism is equally applicable to other types of data and/or resources maintained by the registers to strengthen their securities and protection.

FIG. 1 depicts an example of a diagram of a hardware-based register protection mechanism 100. Although the diagrams depict components as functionally separate, such depiction is merely for illustrative purposes. It will be apparent that the components portrayed in this figure can be arbitrarily combined or divided into separate software, firmware and/or hardware components. Furthermore, it will also be apparent that such components, regardless of how they are combined or divided, can execute on the same host or multiple hosts, and wherein the multiple hosts can be connected by one or more networks.

In the example of FIG. 1, the hardware-based register protection mechanism 100 includes at least one or more registers 102s, an arbiter unit 104, and one or more sources 106s. Each of these components in the hardware-based register protection mechanism 100 is a dedicated hardware block/component or a software running on such hardware block/component. In some embodiments, one or more of these components are programmable by a user at a host (not shown) via software instructions for various operations. When the software instructions are executed, the one or more hardware components becomes a special purposed hardware component for practicing certain machine learning functions.

In the example of FIG. 1, each of the one or more sources (or agents) 106s is a hardware component or a software component running on a hardware. For a non-limiting example, one of the one or more sources 106s can be a software component, e.g., a sideband firmware configured to make changes to and/or repair or update a firmware image of an electronic device. For another non-limiting example, one of the one or more sources 106s can be a hardware component, e.g., a component of a processor/processing core such as an ARM core. In the example of FIG. 1, the one or more registers 102s are configured to store and maintain certain data including but not limited to one or more of status, information, and/or software (e.g., a firmware/firmware image) related to operations, security, and/or IP of an associated electronic device 108, wherein the one or more sources 106s are configured to request access to such data or software maintained in the one or more registers 102s. Here, the electronic device can be but is not limited to a computing device, a communication device, and a storage device. In some embodiments, one or more of the registers 102s, the arbiter 104, and the sources 106s reside within the electronic device 108. In some embodiments, one or more of the registers 102s, the arbiter 104, and the sources 106s reside outside of the electronic device 108 and communicate with the electronic device 108 and each other over one or more communication links and/or networks (not shown).

In some embodiments, the one or more sources 106s are categorized into one or more of a plurality of source types including but not limited to internal sources 106_1 and external sources 106_2. Here, an internal source 106_1 is a source trusted by the electronic device 108 to securely access the one or more registers 102s. For a non-limiting example, the internal source 106_1 can be a trusted application processor within the electronic device 108. For another non-limiting example, the internal source 106_1 can be a secure test-port following an industrial standard, e.g., Joint Test Action Group (JTAG) for verifying designs and testing of the electronic device 108. On the other hand, an external source 106_2 is a source untrusted by the electronic device 108 to securely access the one or more registers 102s. In some embodiments, an external source 106_2 may attempt to initiate access to the one or more registers 102s over an unsecured link or interface such as a PCIe interface or an I2C interface. In some embodiments, each of the one or more sources 106s is assigned with one or more source bits to identify the type of the source 106. In some embodiments, the source bits assigned to each source 106 are maintained within a hardware component (e.g., a bit register, a lock unit, or a storage unit) associated with the source 106, wherein the hardware component cannot be modified by software to prevent hacking via malicious software. In some embodiments, the number of source bits can be adjusted dynamically (e.g., increased) at runtime to accommodate additional types of source categorization for allowable register read and/or write access requests.

In some embodiments, the one or more registers 102s are also classified into one or more of a plurality of register types including but not limited to a set of internal registers 102_1, a set of read-only external registers 102_2, and a set of read/write external registers 102_3. Here, each of the internal registers 102_1 allows read and write access by the internal sources 106_1 only. None of the external sources 106_2 is allowed to have read to write access (operation) to the internal registers 102_1. Like the internal registers 102_1, each of the read-only external registers 106_2 allows read and write access by the internal sources 106_1. Additionally, each of the read-only external registers 106_2 also allows read but not write access by the external sources 106_2. Each of the read/write external registers 106_3 allows read and write access by both the internal sources 106_1 and the external sources 106_3 without restrictions. In some embodiments, each of the one or more registers 102s is assigned with one or more register classification bits utilized to identify the type of the register 102. In some embodiments, the one or more register classification bits assigned to each register 102 is maintained within a hardware component (e.g., a bit register, a lock unit, or a storage unit) associated with the register 102, wherein the hardware component cannot be modified by software to prevent hacking via malicious software. In some embodiments, the number of register classification bits can be adjusted dynamically (e.g., increased) at runtime to accommodate additional types of register classification to accommodate allowable register read and write access requests.

In some embodiments, each of the one or more sources 106s is configured to access a set of the one or more registers 102s for a read or write operation on the data and/or software associated with the electronic device 108 by generating and transmitting a read or write access request. In some embodiments, the access request includes one or more of the type of the access request (to perform a read or write operation), one or more of the registers 102s to be accessed as well as the source bits representing the type of the source 106 transmitting the access request. In some embodiments, the access request is transmitted by the source 106 via an internal register bus of the electronic device 108 if the source is an internal source 106_1. In some embodiments, the access request is transmitted by the source 106 via an external interface to the electronic device 108, e.g., a PCIe interface or an I2C interface, if the source is an external source 106_2.

In some embodiments, the access request transmitted by the source 106 is accepted by an arbiter 104 configured to process the access requests to the one or more registers 102s. In some embodiments, the arbiter 104 is associated with a single or a subset of the one or more registers 102s, wherein more than one arbiter 104 can be utilized to covers all of the registers 102s. In some embodiments, the arbiter 104 is an independent component external to the subset of the one or more registers 102s. In some embodiments, the arbiter 104 is at the destination or an internal component of the one or more registers 102s that are associated with the arbiter 104. Once the access request is accepted, the arbiter 104 is configured to identify the type of the source 106 making the access request by decoding the source bit(s) transmitted with the access request, and the one or more registers 102s the source 106 attempts to access. The arbiter 104 is then configured to retrieve and decode the register classification bits of the identified register 102s and to compare or match the type of the source 102 making the access request with the types of the one or more registers 106s the source 102 attempts to access. Based on the outcome of the comparison between the types of the source 102 and the registers 106s, the arbiter 104 is configured to grant or deny the source 106 read and/or write access to the one or more registers. Specifically, if a read access request is granted, e.g., when the source 106 is an internal source 106_1 and/or the registers 102 are read-only external registers 106_2 or the read/write external registers 106_3, the source 106 is allowed to proceed to read data and/or software from the one or more registers 106s. If a write access request is granted by the arbiter 104, e.g., when the source 106 is an internal source 106_1 and/or the registers 102 are the read/write external registers 102_3, the source 106 is allowed to proceed to write data and/or software to the one or more registers 102s. On the other hand, if a read access request is denied, e.g., when the source 106 is an external source 106_2 and/or the registers 102 are internal registers 102_1, a failed-read (e.g., 0s) signal is sent back to the source 106. If a write access request is denied, e.g., when the source 106 is an external source 106_2 and/or the registers 102 are internal registers 102_1 or read-only external registers 106_2, the write access request is dropped and a failed-write signal is sent back to the source 106.

FIG. 2 depicts a flowchart 200 of an example of a process to support hardware-based register protection. Although the figure depicts functional steps in a particular order for purposes of illustration, the processes are not limited to any particular order or arrangement of steps. One skilled in the relevant art will appreciate that the various steps portrayed in this figure could be omitted, rearranged, combined and/or adapted in various ways.

In the example of FIG. 2, the flowchart 200 starts at block 202, where certain data associated with an electronic device is maintained via one or more registers, wherein each of the one or more registers is classified into one of a plurality of register types. The flowchart 200 continues to block 204, where an access request for read or write access to the certain data maintained in the one or more registers is generated and transmitted by a source, wherein the source is categorized into one of a plurality of source types, wherein the source type of the source is transmitted with the access request. The flowchart 200 continues to block 206, where the access request is accepted and the one or more registers to be accessed for a read or write operation are identified. The flowchart 200 continues to block 208, where the register types of the one or more registers to be accessed are identified. The flowchart 200 continues to block 210, where the source type of the source requesting access to the one or more registers is compared with the register types of the one or more registers. The flowchart 200 ends at block 212, where whether to grant or deny read or write access to the one or more registers by the source is determined based on the comparison between the source type of the source requesting access and the register types of the one or more registers to be accessed.

The foregoing description of various embodiments of the claimed subject matter has been provided for the purposes of illustration and description. It is not intended to be exhaustive or to limit the claimed subject matter to the precise forms disclosed. Many modifications and variations will be apparent to the practitioner skilled in the art. Embodiments were chosen and described in order to best describe the principles of the invention and its practical application, thereby enabling others skilled in the relevant art to understand the claimed subject matter, the various embodiments and the various modifications that are suited to the particular use contemplated.

What is claimed is:

1. A hardware-based register protection mechanism, comprising:
   one or more registers configured to maintain certain data associated with an electronic device, wherein each of the one or more registers is classified into one of a plurality of register types, wherein each register type is associated with a level of security of the certain data;
   a source configured to generate and transmit an access request for read or write access to the certain data maintained in the one or more registers, wherein the source is categorized into one of a plurality of source types, wherein each source type is associated with a level of trust with the electronic device, wherein the source type of the source is transmitted with the access request; and
   an arbiter configured to
     accept the access request with the source type from the source and identify the one or more registers to be accessed for a read or write operation;
     identify the register types of the one or more registers to be accessed;
     compare the source type of the source requesting access to the one or more registers with the register types of the one or more registers; and
     determine whether to grant or deny read or write access to the one or more registers by the source based on the comparison between the source type of the source requesting access and the register types of the one or more registers to be accessed.

2. The hardware-based register protection mechanism of claim 1, wherein:
   the certain data associated with the electronic device includes one or more of status, information, and software related to one of operations, security, and IP of the electronic device.

3. The hardware-based register protection mechanism of claim 2, wherein:
the software is a firmware of the electronic device.

4. The hardware-based register protection mechanism of claim 1, wherein:
the source is categorized into one of an internal source that is trusted by the electronic device to securely access the one or more registers, and an external source untrusted by the electronic device to securely access the one or more registers.

5. The hardware-based register protection mechanism of claim 4, wherein:
the source is configured to transmit the access request via an internal register bus of the electronic device if the source is an internal source.

6. The hardware-based register protection mechanism of claim 4, wherein:
the source is configured to transmit the access request via an external interface to the electronic device if the source is an external source.

7. The hardware-based register protection mechanism of claim 4, wherein:
the source is assigned with one or more source bits to identify the type of the source.

8. The hardware-based register protection mechanism of claim 7, wherein:
the one or more source bits assigned to the source are maintained within a hardware component associated with the source, wherein the hardware component cannot be modified by software.

9. The hardware-based register protection mechanism of claim 7, wherein:
the one or more source bits are adjustable dynamically at runtime to accommodate additional types of source categorization for allowable register read and/or write access.

10. The hardware-based register protection mechanism of claim 7, wherein:
the access request includes one or more of type of the access request, one or more of the registers to be accessed, and the one or more source bits representing the type of the source transmitting the access request.

11. The hardware-based register protection mechanism of claim 4, wherein:
each of the one or more registers is classified into one of a set of internal registers that allows read and write access by the internal source only, a set of read-only external registers that allows read and write access by the internal source and read but not write access by the external source, and a set of read/write external registers that allows read and write access by both the internal source and the external source without restrictions.

12. The hardware-based register protection mechanism of claim 11, wherein:
each of the one or more registers is assigned with one or more register classification bits utilized to identify the register type.

13. The hardware-based register protection mechanism of claim 12, wherein:
the one or more register classification bits assigned to each register are maintained within a hardware component associated with the register, wherein the hardware component cannot be modified by software.

14. The hardware-based register protection mechanism of claim 13, wherein:
the one or more register classification bits are adjustable dynamically at runtime to accommodate additional types of register classification for allowable read and/or write access to the register.

15. The hardware-based lock mechanism of claim 12, wherein:
the arbiter is configured to retrieve and decode the register classification bits of the identified one or more registers and to match the source type of the source making the access request with the register types of the one or more registers the source attempts to access.

16. The hardware-based lock mechanism of claim 1, wherein:
the arbiter is associated with a single or a subset of the one or more registers.

17. The hardware-based lock mechanism of claim 16, wherein:
the arbiter is an independent component external to the subset of the one or more registers that are associated with the arbiter.

18. The hardware-based lock mechanism of claim 16, wherein:
the arbiter is at the destination or an internal component of the subset of the one or more registers that are associated with the arbiter.

19. The hardware-based register protection mechanism of claim 1, wherein the certain data comprising software is associated with a level of security higher than a level of security associated with the certain data devoid of software.

20. The hardware-based register protection mechanism of claim 1, wherein an internal source type is associated with a level of trust higher than a level associated with an external source type.

21. A method to support hardware-based register protection, comprising:
maintaining certain data associated with an electronic device via one or more registers, wherein each of the one or more registers is classified into one of a plurality of register types, wherein each register type is associated with a level of security of the certain data;
generating and transmitting an access request by a source for read or write access to the certain data maintained in the one or more registers, wherein the source is categorized into one of a plurality of source types, wherein each source type is associated with a level of trust with the electronic device, wherein the source type of the source is transmitted with the access request;
accepting the access request with the source type from the source and identifying the one or more registers to be accessed for a read or write operation;
identifying the register types of the one or more registers to be accessed;
comparing the source type of the source requesting access to the one or more registers with the register types of the one or more registers; and
determining whether to grant or deny read or write access to the one or more registers by the source based on the comparison between the source type of the source requesting access and the register types of the one or more registers to be accessed.

22. The method of claim 21, further comprising:
categorizing the source into one of an internal source that is trusted by the electronic device to securely access the one or more registers, and an external source untrusted by the electronic device to securely access the one or more registers.

23. The method of claim 22, further comprising:
transmitting the access request via an internal register bus of the electronic device if the source is an internal source.

24. The method of claim 22, further comprising:
transmitting the access request via an external interface to the electronic device if the source is an external source.

25. The method of claim 22, further comprising:
assigning the source with one or more source bits to identify the type of the source.

26. The method of claim 25, further comprising:
maintaining the one or more source bits assigned to the source within a hardware component associated with the source, wherein the hardware component cannot be modified by software.

27. The method of claim 22, further comprising:
classifying each of the one or more registers into one of a set of internal registers that allows read and write access by the internal source only, a set of read-only external registers that allows read and write access by the internal source and read but not write access by the external source, and a set of read/write external registers that allows read and write access by both the internal source and the external source without restrictions.

28. The method of claim 27, further comprising:
each of the one or more registers is assigned with one or more register classification bits utilized to identify the register type.

29. The method of claim 28, further comprising:
maintaining the one or more register classification bits assigned to each register within a hardware component associated with the register, wherein the hardware component cannot be modified by software.

30. The method of claim 28, further comprising:
retrieving and decoding the register classification bits of the identified one or more registers and to match the source type of the source making the access request with the register types of the one or more registers the source attempts to access.

* * * * *